United States Patent

[11] 3,612,202

| [72] | Inventors | Harry C. Moon, Jr. Ogelsby; John W. Pinkerton, La Salle, both of Ill. |
|---|---|---|
| [21] | Appl. No. | 829,440 |
| [22] | Filed | June 2, 1969 |
| [45] | Patented | Oct. 12, 1971 |
| [73] | Assignee | Sundstrand Corporation |

[54] HYDROSTATIC WHEEL ASSIST
18 Claims, 3 Drawing Figs.

[52] U.S. Cl. ........................................ 180/14 A,
180/66 R, 60/19, 180/75
[51] Int. Cl. ................................................. B62d 59/04
[50] Field of Search ........................................... 180/14, 66,
44, 70, 75; 60/19

[56] References Cited
UNITED STATES PATENTS

| 3,374,847 | 3/1968 | Budzich............... | 180/14 |
| 1,981,805 | 11/1934 | Kacer et al............ | 60/19 |
| 3,090,458 | 5/1963 | Wolf.................... | 180/14 |
| 3,180,080 | 4/1965 | Budzich et al......... | 60/19 |
| 3,212,263 | 10/1965 | Hann.................... | 180/66 X |
| 3,293,942 | 12/1966 | Stein et al............. | 180/14 X |
| 3,360,064 | 12/1964 | Budzich et al......... | 180/14 |
| 3,430,722 | 3/1969 | Budzich................ | 60/19 X |
| 3,442,153 | 5/1969 | Ross.................... | 60/19 X |
| 3,480,099 | 11/1969 | Nighswonder et al. | 180/66 x |

Primary Examiner—Kenneth H. Betts
Attorney—Hofgren, Wegner, Allen, Stellman & McCord ABSTRACT: A hydrostatic assist drive for a tractor-trailer driven by the prime mover of the tractor, that may be selectively initiated to drive the wheels of the trailer through a two-speed differential, there being provided a control which maintains the torque of the hydrostatic drive a percentage of the total tractive effort of the tractor-trailer, and also a delay device on the torque control for the hydrostatic drive to maintain the tractive effort provided by the hydrostatic assist drive during shifting of the main tractor transmission, there being also provided a valve for unloading the hydrostatic drive train during shifting of the two-speed differential.

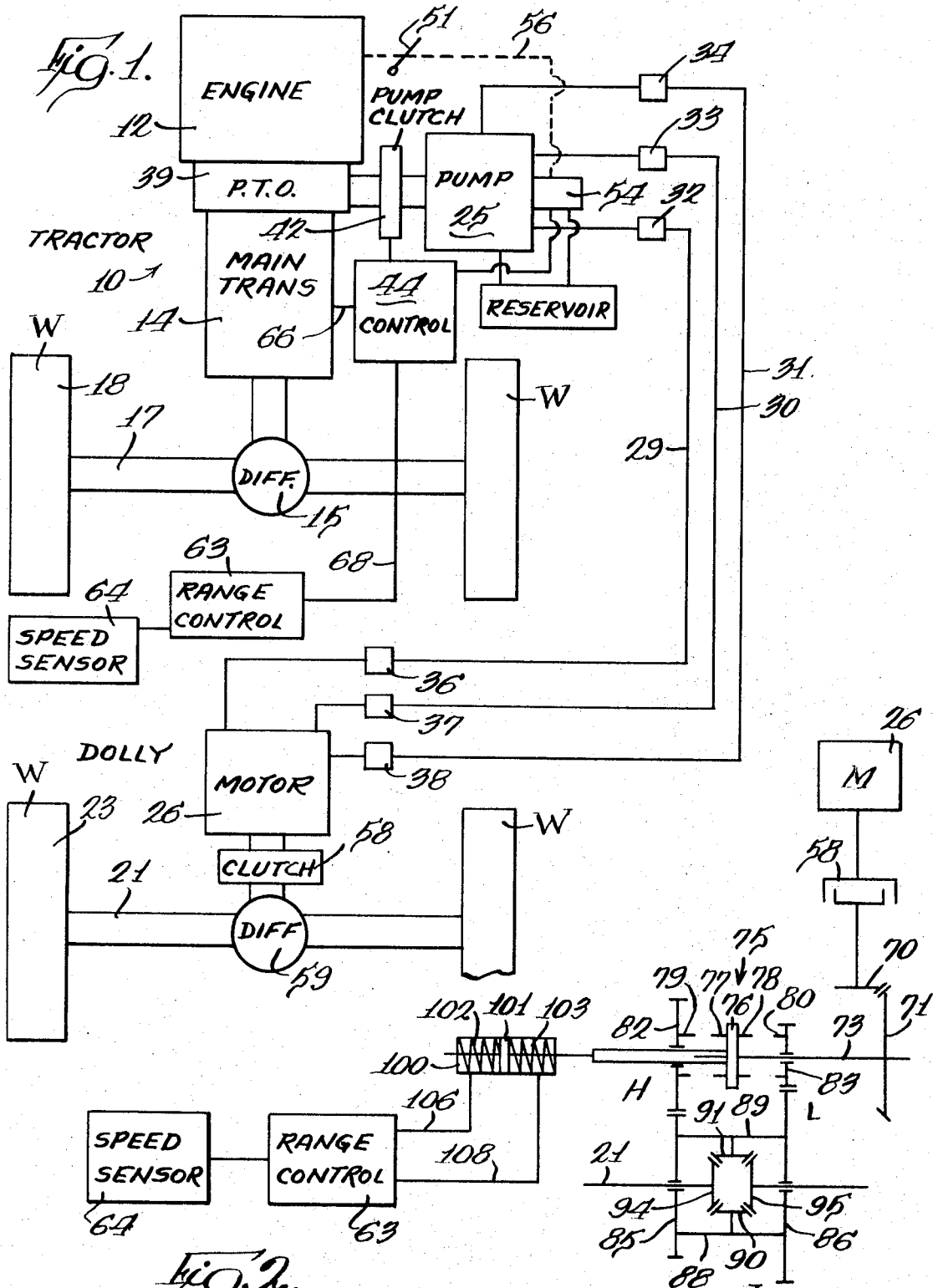

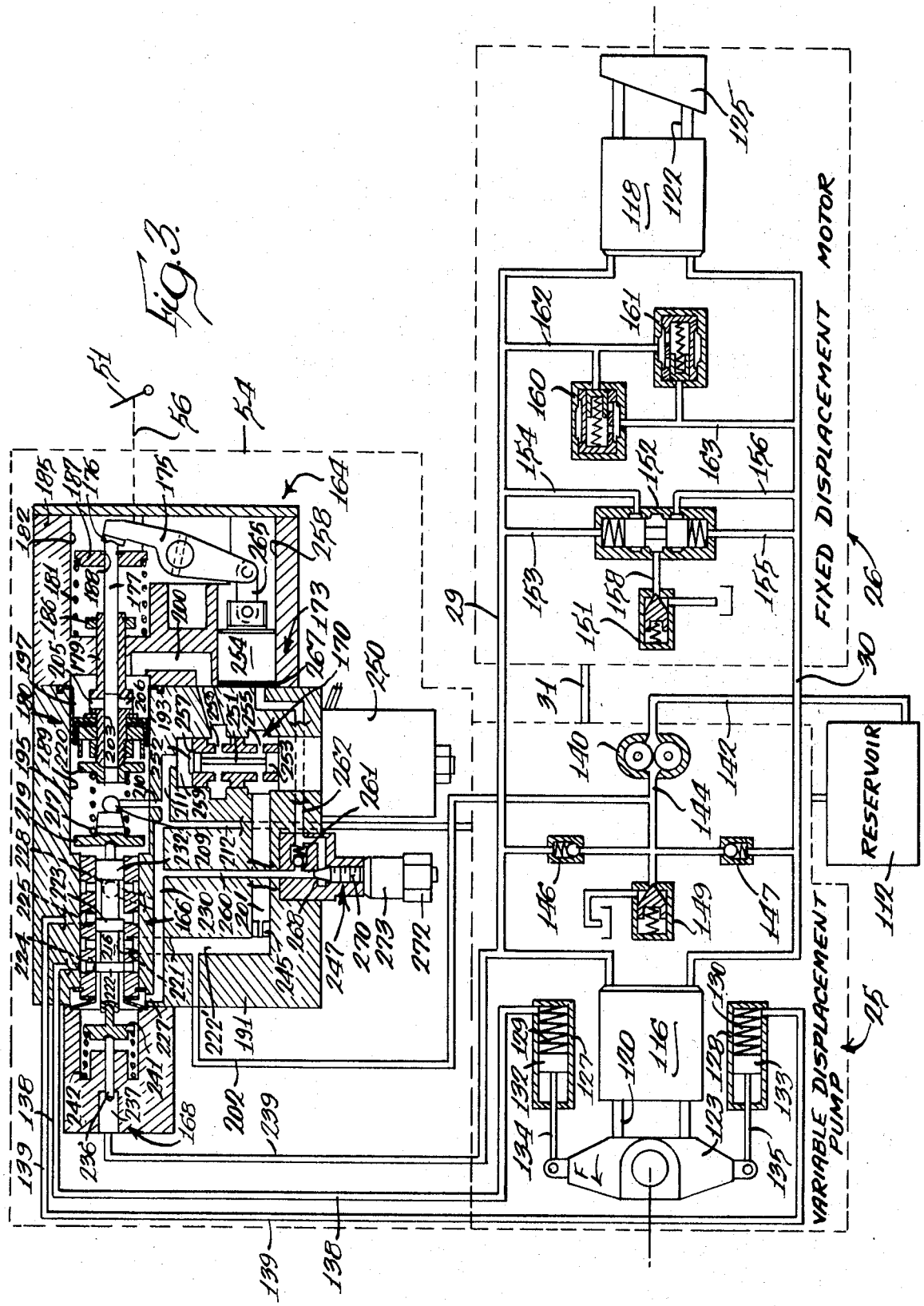

3,612,202

HYDROSTATIC WHEEL ASSIST

BACKGROUND OF THE PRESENT INVENTION

It has been proposed in the past that various drives be provided for one of the axles on the trailer of a tractor-trailer vehicle for the purpose of assisting the tractive effort provided by the tractor. These assist transmissions have not found any considerable success, primarily because of a failure to provide an assist transmission that complements and is coordinated with the control of the main tractor transmission and the tractive effort provided by the tractor wheels.

It is the primary object of the present invention to satisfy these basic deficiencies in prior assist systems.

SUMMARY OF THE PRESENT INVENTION

In accordance with the present invention, a hydrostatic drive is provided for driving an axle on the trailer of a tractor-trailer vehicle. The hydrostatic assist transmission includes a tractor-mounted variable-displacement pump which is driven by the tractor prime mover through a selectively operable clutch. The hydraulic motor of the hydrostatic transmission is carried by the trailer and drives one of the trailer axles, referred to herein as the dolly axle, through a two-speed differential.

The hydrostatic transmission provides a wheel assist in the low dolly axle range up to approximately 12 m.p.h. Thereafter, the two-speed differential is shifted to a high axle range up to approximately 35 m.p.h. At higher speeds the hydrostatic transmission with its consequent assist function is cut out and the vehicle is driven solely by the tractor wheels.

A control is provided for the torque output of the hydrostatic assist transmission so that the tractive effort provided at the dolly axle never exceeds the main tractor drive axle tractive effort, and moreover, remains a substantially fixed percentage of the total vehicle tractive effort. To achieve this result, a torque control for the transmission is interconnected to the main vehicle throttle.

There is also provided a control for maintaining the tractive effort of the hydrostatic wheel assist during shifting gear ratios in the main mechanical transmission. This is accomplished through the use of a dashpot assembly associated with the torque control for the hydrostatic transmission. Since the torque control of the hydrostatic transmission is varied by engine throttle position as noted above, the release of the accelerator during shifting of the main transmission by the operator would normally cause a reduction in torque of the hydrostatic assist drive as well. However, the dashpot assembly retards this effect and permits only a gradual decrease in torque of the hydrostatic transmission upon a rapid release of the main tractor accelerator by the operator.

There is further provided a valve associated with the torque control of the hydrostatic assist transmission that drives the pump of the hydrostatic transmission to zero displacement during shifting of the two-speed dolly axle associated with the trailer. This unloads the gearing associated with the dolly axle and facilitates shifting from the low dolly axle range to the high dolly axle range, as well as down shifting.

A speed-responsive control is provided for automatically shifting the two-speed dolly differential from a low assist range to a high assist range at a predetermined vehicle speed, for example, 12 m.p.h. The two-speed differential significantly extends the range of useful assist provided by the present hydrostatic assist drive.

BRIEF DESCRIPTION OF THE DRAWINGS

FIG. 1 is a schematic diagram of the tractor drive, the driving tractor axle, and the dolly axle, with the hydrostatic transmission and controls associated therewith;

FIG. 2 is a schematic diagram of the two-speed differential shown in FIG. 1 along with the low to high range control; and FIG. 3 is a schematic diagram of the hydrostatic transmission shown in FIG. 1 with the controls therefor.

DESCRIPTION OF THE PREFERRED EMBODIMENT

Referring to the drawings and particularly FIG. 1, a tractor 10 as illustrated is seen to include a prime mover 12 which may take the form of a diesel engine, a multiple-ratio mechanical transmission 14 driven by the engine, a differential 15 driven by transmission 14, a tractor axle 17 driven through the differential and main tractor-driving wheels 18.

The tractor 10 is intended to be connected to and provide the primary driving force for one or more trailers pulled thereby. The trailers are not shown in FIG. 2, but a dolly axle 21 for one of the trailers is illustrated drivingly connected to wheels 23, which may be regarded as trailer wheels when the dolly is connected to a trailer.

A hydrostatic transmission is provided for driving the dolly axle 21 and providing a tractive effort for the vehicle which remains a substantially fixed percentage of the total vehicle-tractive effort, but does not exceed the tractive effort provided at the main tractor wheels 18. The hydrostatic transmission generally includes a hydraulic pump 25 which supplies fluid under pressure to a hydraulic motor 26.

The pump 25 is carried by the tractor 10, and the motor 26 is carried by the dolly associated with the axle 21. For the purpose of conveying fluid between the pump 25 and the motor 26, flexible conduits 29, 30 and 31 are provided releasably connected to the pump 25 by couplings 32, 33 and 34 at one end, and releasably connected at the other end to motor 26 through releasable couplings 36, 37 and 38.

The pump 25 is driven from the main prime mover through a pump power takeoff gearbox 39 which drives the pump through a main pump clutch 42. The pump clutch 42 may be selectively operable through suitable controls within the tractor whenever hydrostatic assist is desired and similarly clutch 42 may be disengaged to cease assist whenever desired. The control for the clutch 42, as well as certain other controls in the present system, is indicated at 44 in FIG. 1.

A throttle pedal 51 is provided for controlling the fuel throttle (not shown) of engine 12. As is well known, depression of throttle control 51 will increase the flow of fuel to engine 12 and thereby increase the torque at the tractor wheels 18. A torque control 54 is provided for controlling the torque of the hydrostatic assist transmission. A description of the torque control is set forth in more detail below, but briefly its function is to maintain the tractive effort provided at the dolly axle 21 a substantially fixed percentage of the total vehicle-tractive effort and always below the tractive effort provided by the main tractor wheels 18. Toward this end, the throttle 51 is interconnected to the torque control 54 through a suitable linkage 56. In this manner, as the operator calls for an increase in torque from the engine 12 to increase torque at the main tractor wheels 18, the torque output of the hydrostatic transmission will also be increased providing a proportional increase in torque at the dolly axle 21.

The motor 26 of the present hydrostatic assist transmission drives the dolly axle 21 through an overrunning clutch 58 and a two-speed differential 59. The overrunning clutch 58 prevents the trailer associated with the dolly axle 21 from driving the hydrostatic transmission.

The two-speed differential 59 significantly increases the speed range of the present hydrostatic assist transmission so that the effective range thereof may be doubled. As described below in more detail with reference to FIG. 2, the two-speed differential 59 is a gear differential selectively actuated by a sliding dog clutch. For the purpose of placing the two-speed differential 59 in either its low speed range, its high speed range, or in a neutral nondriving mode, a differential speed range control 63 is provided along with a ground speed sensor 64. The speed sensor 64 may take the form of a conventional governor and it is interconnected to provide a signal to the range control at a predetermined speed, e.g. 12 m.p.h. In response to this signal, the range control, which may take the form of conventional valving, ports air to an actuator in the two-speed differential and shifts the two-speed differential from its low speed range to its high speed range. When the signal from the speed sensor ceases, indicating that the vehicle speed is reduced below the predetermined dolly axle shift speed, the range control 63 ports fluid to drive the two-speed differential back to its low range.

Moreover, the master control 44 is functionally interconnected with the main transmission 14 through a suitable interconnection shown at 66 so that it provides a signal through line 68 to the range control 63 whenever the operator shifts the main transmission into one of the higher gears. In response to this signal in line 68, the range control shifts the two-speed differential to a neutral position. At the same time, control 44 disengages clutch 42 automatically cutting out the hydrostatic assist drive. The cutout gear is selected so that assist ceases at approximately 35 m.p.h., for example. It is also possible to terminate the assist function in response to vehicle speed rather than shifting the main transmission 14 into a predetermined upper gear. This can be accomplished through speed sensor 64 and range control 63 as well as master control 44.

The two-speed differential 59 is shown more clearly in FIG. 2. The overrunning clutch 58 is seen to drive bevel gears 70 and 71 which in turn drive a shaft 73 extending transverse to the trailer.

Shaft 73 drives a sliding dog clutch 75 including an axially shiftable member 76 having a left dog set 77 and a right dog set 78 selectively engageable with dogs 79 and 80 on gears 82 and 83, respectively. The slidable clutch member 76 is in a neutral position in FIG. 2, whereat neither gears 82 or 83 are driven thereby since none of the clutch dogs are engaged. It should be understood the gears 82 and 83 are freely rotatable on shaft 73 and that member 76 is rotatably fixed thereto.

The axles 21 may be driven from either of the gears 82 or 83 through one of the gears 85 or 86 which interengage therewith, respectively. Gears 85 and 86 are freely rotatable on axles 21 and are fixed with respect to carriers 88 and 89, which rotatably receive planetary gears 90 and 91 of a bevel gear differential 92. When driven in rotation about axle 21 in planetary movement, gears 90 and 91 differentially drive the intermeshing bevel gears 94 and 95 drivingly connected to the dolly axles 21.

For the purpose of shifting the sliding dog clutch 75 from its neutral position to either its high or low range positions a pneumatic actuator 100 is provided including a cylinder with a piston 101 slidably mounted therein and biased to a neutral position by springs 102 and 103. In the neutral position shown the sliding dog clutch 75 is in neutral and the axle may be freely driven by the road without driving motor 26.

When the hydrostatic assist is initiated, the range control 63 ports fluid through line 106 to the left side of actuator 100 shifting piston 101 to the right and engaging dogs 78 and 80. This effects the low-range mode by driving axles 21 through gears 83 and 86. Upon receipt of a shift signal from speed sensor 64 the range control 63 ports fluid to line 108 driving piston 101 to the left interengaging the dogs 77 and 79 thereby driving axles 21 through gears 82 and 85. This is the high speed range of differential 59. Upon receipt of an assist cease signal from control 44, the range control 63 connects both lines 106 and 108 to drain permitting centering springs 102 and 103 to center piston 101 driving the internal driving clutch member 76 to its neutral position freeing both gears 82 and 83.

The pump 25, motor 26 and pump control 54 are shown in more detail in FIG. 3. The pump control 54 may be fixed to the pump casing by suitable means not shown in FIG. 3. A reservoir 112 is provided to supply fluid to the system and receive fluid from the pump casing through a conduit.

As seen in FIG. 3, the pump 25 and motor 26 are innerconnected by conduits 29 and 30 although it should be noted the releasable couplings are not shown in FIG. 3. Conduit 29 delivers fluid from the pump to the motor and conduit 30 returns fluid from the motor to the pump. Conduit 31 serves the purpose of draining fluid from the motor casing to the pump casing.

Preferably both the pump and the motor are of an axial piston type having rotatable cylinder blocks 116 and 118, respectively, each with a plurality of cylinders in annular array, and reciprocal pistons 120 and 122, respectively, having ends reciprocating in the cylinders. The pump 25 has a variable-angle swashplate 123 engaged by projecting ends of pistons 120 for controlling the speed and torque of the present hydrostatic transmission. The motor has a fixed displacement inclined cam plate 125 engaged by the pistons 122.

For positioning the pump swashplate, two pump control cylinders 127 and 128 are provided. The pump control cylinders 127 and 128 house centering springs 129 and 130, respectively, and include pistons 132 and 133 on rods 134 and 135, respectively, which are pivotally secured to the swashplate for positioning the same in response to supply of control fluid to the cylinders by means of conduits 138 and 139, respectively. The springs normally act through the pistons to position the pump swashplate as shown in FIG. 3 in a position of minimum or zero displacement so that there is no positive output from the pump 25. The control cylinders are of the conventional single-action type so that the influx of fluid under pressure in one cylinder will cause the swashplate to tilt in a given direction and the influx of fluid under pressure in the opposite cylinder will cause reverse tilting so that the swashplate may be positively driven in opposite direction increasing or decreasing displacement of the pump 25 as desired.

A positive-displacement-gear-type replenishing and cooling pump 140 is provided and is driven by suitable means by the engine or prime mover 12. The replenishing and cooling pump is in communication with reservoir 112 through intake conduit 142 for supplying replenishing and cooling fluid to the system through the replenishing and cooling conduit 144. The capacity of the pump is sufficient to replace leakage fluid, supply control fluid to the pump control 54 and to supply cooling fluid to the circuit in excess of that required for the aforementioned purposes in order to maintain the transmission cooled.

A pair of spring-biased check valves 146 and 147 are in communication with the conduit 144 and with the conduits 29 and 30, respectively, for supplying the replenishing and cooling fluid to the low-pressure side of the circuit through one check valve while pressure in the high-pressure conduit will maintain the other check valve closed. A spring-biased makeup relief valve 149 communicates with the conduit 144 and serves to relieve excess fluid pressure.

For establishing a circuit between the main line 29 or 30 that is at low pressure and a low-pressure relief valve 151, a shuttle valve 152 is provided. The shuttle valve is in communication with the conduits 29 and 30 by means of conduits 153, 154, 155 and 156, and provides a means for removing heated oil displaced by cooling oil supplied by replenishing pump 140. The fluid pressure in the conduits 29 and 30 acts through the conduits 153 and 155, respectively, to appropriately position the shuttle valve so that communication is established from the low-pressure relief valve through a conduit 158 to the low-pressure side of the transmission circuit by means of either the conduit 154 or the conduit 156 so that the heated fluid may be drained into the reservoir therefrom. Shuttle valve 152 is spring centered to a closed position so that during the transition of reversal of pressure in the main lines none of the high-pressure oil is lost in the circuit.

The transmission includes over pressure relief valves 160 and 161 in communication with each of the conduits by means of the conduits 162 and 163, respectively. The valves serve to prevent abnormally high pressure in either of the two main hydraulic lines 29 and 30 by relieving the circuit of surge pressures which may occur during rapid acceleration or abrupt braking. In response to this high pressure, the overpressure valves shift to dump the excess oil to the low-pressure side of the transmission circuit. For example, when high pressure exists in line 29, then excessive pressure fluid through conduit 162 will cause valve 160 to shift to shunt the fluid to line 30 through conduit 163.

As described above, the pump displacement control 54 is a torque control that controls the displacement of the pump 25 in a manner to maintain the torque of the hydrostatic assist transmission a percentage of the total vehicle tractive effort. The torque control is seen to consist generally of an input assembly 164, a torque valve 166, a system pressure sensor 168, a neutral driving valve 170 and a control delay dashpot assembly 173.

The primary input signal to the control 54 is provided by a pivotally mounted control member 175 in the input assembly 164. The control member 175 is positioned through interconnection 56 by the main engine throttle pedal 51. Member 175 has an end portion 176 which engages an axially movable rod 177 slidable in a stepped sleeve 179 which is a part of a bellows piston assembly 180. The rod 177 is biased against the end portion 176 by a spring 181 seated within a bore 182 in input housing 185. Spring 181 biases a spring seat 187 held in position by a snapring 188 on rod 177. Sleeve 179 has an annular member 186 on the right end thereof which is fixed to the sleeve 179 and serves as a stop when it engages the left end of bore 182 limiting the leftward movement of piston assembly 180.

Piston assembly 180 is slidably received in a cylinder 189 within valve housing 191. A bellows 193 carried by the piston assembly 180 separates bore 189 into a low-pressure chamber 195 and a modulated-pressure chamber 197.

Chamber 197 communicates with charge fluid from pump 140 through passage 200, across neutral valve 170, passage 201 and passage 202 which communicates with charge pump outlet passage 144.

The piston assembly 180 has a through bore 203 which slidably receives the rod 177. Communicating with the bore 203 are radial passages 205 and 206 which communicate directly with the interior of chamber 197. The position of the rod 177 modulates pressure within chamber 197 by throttling flow through the passages 205 and 206. With the rod 177 in the position shown in FIG. 3, chamber 197 is fully vented, the fluid flowing therein through passage 200 passing through ports 205 and 206, through central bore 203 into low-pressure chamber 195. Chamber 195 continues to communicate through port 209 and passages 210, 211, with a drain passage 212 which empties into the pump casing.

As the control member 175 is pivoted counterclockwise from its position shown in FIG. 3, shifting rod 177 to the left, the rod throttles flow through ports 205 and 206, and pressure builds up in chamber 197 shifting piston assembly 180 to the right. In this manner, the piston assembly 180 may be positioned as desired within bore 189. It is the position of rod 177 and the piston assembly 180 that calls for the desired torque from the present hydrostatic transmission.

The piston assembly 180 biases a movable valve member 216 in control valve 166 through a coil spring 217 which has spring seats 219 and 220 at each end thereof. Spring seat 219 engages the right end of valve member 216 biasing it to the left, opening charge port 221 to line 138 between valve lands 222 and 223. Port 221 communicates with charge fluid through charge passage 222' and passage 202.

Valve 166 has a port 224 communicating with passage 138; a port 225 communicating with passage 139; and a left drain port 227, and a right drain port 228 both communicating with drain passage 230 which in turn communicates with drain passage 212.

Thus, when valve member 216 is shifted to its left position shown in the drawing, charge fluid will be ported from port 221 into port 224 and line 138 pressurizing control motor 127 pivoting swashplate 123 in a counterclockwise direction delivering fluid through conduit 29 and driving motor 26 in a forward direction. At the same time fluid is returned from control cylinder 128 through line 139 to port 225, between lands 223 and 232 into drain port 228.

When the pressure called for by the position of control member 175 has been achieved in conduit 29, the valve member 216 will move back to the right to a modulating position wherein land 222 just blocks port 224. Toward this end pin 236 communicates at one end with a cylinder 237 forming part of the pressure-sensing assembly 168. Chamber 237 communicates with the conduit 29 through passage 239. In this manner the hydraulic force applied to the pin 236 will be proportional to the pressure in conduit 29 and thus represent transmission torque. Pine 236 biases the torque valve 216 to the right through a spring seat 241 which is biased in engagement with the left end of the valve by a spring 242.

The operation of the control 54 thus far described is as follows. With the control rod 177 in the position shown, the variable orifice defined by the ports 205 and 206 offers very little flow restriction and therefore most of the pressure drop between the charge pump and pump case pressure occurs across an orifice 245 in charge pressure line 222'. However, as the control rod 177 is shifted to reduce the port openings 205 and 206, flow across orifice 245 is reduced, and less pressure drop is taken across the orifice and a greater pressure drop is taken across the ports 205 and 206 resulting in a pressure buildup in chamber 197. The pressure buildup in chamber 197 is transmitted through the piston assembly 180 and spring 217 to the valve member 216. If this force is great enough to overcome the pressure force on pin 236, the spring force of dump spring 242, and the friction forces, the valve spool will shift to the left as described above porting fluid into conduit 138, resulting in a stroking of control motor 127 and a destroking of control motor 128, biasing the pump swashplate into full stroke.

The resulting increase in pumping rate causes an acceleration of the load, requiring increased output torque, which increases system pressure. Feedback to the control is provided through conduit 239 which responds to pressure in main conduit 29. System pressure will increase until the force acting on pin 236 is great enough to compress power spring 217 allowing the valve 216 to shift back to a modulating position where it will maintain the level of output torque which corresponds to the position of control member 175.

Maintaining the selected constant output torque, or system pressure, is accomplished in the following manner, assuming the control member 175 to be in fixed position. It can be seen that in the steady-state condition there can be no unbalance of forces acting parallel to the axis of the valve spool 216 so that the product of the pressure in the control chamber 197 and the effective area of piston assembly 180 must equal the product of the pressure in the pressure-sensing cylinder or chamber 237 and the end area of the pressure-sensing rod or pin 236. Any change in operating conditions which disturbs this balance will produce action of the control components to adjust the stroke of the pump, maintaining constant output torque and the force balance previously described.

The neutral centering valve 170 serves as an on-off control for the hydrostatic drive in conjunction with clutch 42. Valve 170 is positioned by a solenoid 250 which is controlled through the master control circuit 44 shown in FIG. 1. Valve 170 includes a movable valve member 251 having an upper land 252 and a lower land 253 controlling communication between ports 255, 256 and valve seat 257. It should be noted that land 252 acts as a valve member engaging valve seat 257, blocking flow into the low-pressure end 259 of valve 170 which communicates with drain conduit 212 through passage 211. The valve member 170 is in its "on" position as shown in FIG. 3 permitting communication between ports 255 and 256, providing charge pressure flow to chamber 197. When solenoid 250 is deenergized valve 251 moves upwardly blocking port 255 and communicating port 256 with low-pressure drain chamber 259 resulting in an immediate drop in pressure in chamber 197. The flow from chamber 197 will continue until the pressure in the chamber is equal to the pressure in the pump case. This pressure reduction in chamber 197 creates an unbalance of forces on the valve spool 216 allowing a complete destroking of pump 25 reducing the output torque to zero. This action takes place over a very short period of time giving the control a rapid rate of response in the on to off switching. It should be noted that the transmission may be switched on or off regardless of the position of control member 175.

The control delay or dashpot assembly 173 is provided for reducing the control effect caused by a rapid clockwise movement of control member 175. This would occur, for example, when the operator rapidly releases the accelerator or throttle 51 during shifting of the main mechanical transmission 14. It can be seen that the control member return spring 181 would, in the absence of dashpot assembly 173, immediately return control member 175 and swashplate 123 to their neutral positions. This rapid response may not be acceptable in an application where a controlled rate of deceleration is desired. Moreover, it is desirable that the tractive effort provided by the hydrostatic assist transmission continue during shifting of the main mechanical transmission 14.

The dashpot assembly 173 and a flow control valve 247 are provided to control the return to neutral of the control member 175. As the control member 175 is rotated counterclockwise, dashpot piston 254, which is pivotally connected to control member 175, moves to the right in dashpot cylinder 258 drawing fluid at case pressure into the cavity left by piston 254. This causes oil to flow through conduit 260 in housing 191, through a ball check valve 261 in the control valve 247 through conduit 262 into the dashpot cylinder 258. Upon release of the control handle 175, the force of the return spring 181 biases the control handle to rotate clockwise about its pivot, transmitting the spring force to the dashpot piston 254 to produce pressure in the dashpot chamber 267. Fluid then flows out of the chamber 267, as a result of the pressure increase, through conduit 262, closing ball check valve 261 forcing oil to flow through a variable orifice 268, defined by an adjustable threaded throttling member 270. This fluid then returns to the pump case through conduits or passages 260 and 212.

The size of the orifice 268 may be controlled by rotation of nut 272 which threadedly receives throttling member 270. Shaft 273 may be color coded to indicate the size of the orifice.

While the operation of the transmission is believed apparent from the above description, the following summary will provide a more clear understanding of the operating modes of the present transmission in conjunction with the operation of the vehicle tractor.

It should be understood that main control 44 is provided with suitable circuitry to effect the described functions automatically in response to either an on-off control button operable by the operator or in response to a specific shift of the main transmission 14. Such circuitry would be obvious to one skilled in this art and for this reason it is not shown in detail in the drawings.

The assist function is initiated by the operator's pressing the "on" button within the tractor. In response to this, control 44 shifts the two-speed differential 59 into the low range to assure proper matching of the motor speed to the vehicle speed. After the axle has shifted, control 44 engages pump clutch 42. The hydrostatic transmission then drives the dolly axle 21 and control 54 controls torque of the hydrostatic transmission in the manner described above. The two-speed differential shifts from a low speed range to a high speed range as the vehicle speed increases above a predetermined intermediate level, preferably around 12 m.p.h. At this speed, sensor 64 delivers a signal to range control 63 which delivers a signal to master control 44 to energize the neutral driving solenoid 250. This destrokes the pump and results in unloading the drive train and slowing down motor 26. Range control 63 then delivers fluid to actuator 100 placing the two-speed differential in the high range. After the shift has been completed, control 44 deenergizes pump neutral valve solenoid 250 activating the assist system by putting the pump 25 into stroke.

When the vehicle reaches a relatively high speed, e.g. 35 m.p.h., the control 44 senses this condition either by a particular shift of the main transmission 14 or by speed sensor 64, and deenergizes the main pump clutch 42 immediately terminating the hydrostatic assist function. Thereafter, control 44 through range control 63 depressurizes the actuator 100 placing the dolly axle in a neutral, fail-safe position. At higher speeds the vehicle is then propelled only by the tractor 10.

As the speed of the vehicle is reduced, the hydrostatic assist automatically cuts in, in response to a downshift of the main transmission to a predetermined ratio or in response to vehicle speed. In response to this, control 44 and range control 63 shift the two-speed differential into the proper range and thereafter engage main clutch 42.

When the predetermined low-range speed is sensed by speed sensor 64, range control 63 provides a signal to master control 44 which energizes the pump neutral valve solenoid 250 destroking pump 25. Range control 63 places the two-speed differential 59 into its low range and when the shift is completed, control 44 deenergizes the pump solenoid 250 activating the pump 25 and starting assist again.

To terminate hydrostatic assist, the operator pushes the off button which, through control 44, deenergizes pump clutch 42 and through range control 63 places the two-speed differential 59 in its neutral fail safe position.

The control 44 responds to the placement of main transmission 14 in reverse and deenergizes the pump clutch 42 to prevent hydrostatic assist during reverse operation of the vehicle. At the same time the two-speed differential 59 is placed in neutral allowing reverse movement of the vehicle without turning the shaft associated with motor 26.

We claim:

1. A hydrostatic assist drive for a tractor-trailer which drives the wheels of the trailer to assist the main tractor drive, comprising: a hydraulic pump unit, a hydraulic motor unit, conduit means for conveying fluid from the pump to the motor, means for varying the displacement of one of said units, a plural-range axle drive driven by said motor unit, and means responsive to the speed of the tractor-trailer for selecting the range of the axle drive.

2. A hydrostatic assist drive as defined in claim 1, wherein said axle drive has a low range and a high range, said means responsive to tractor-trailer speed being responsive to a predetermined speed to shift the axle drive from a low range to a high range.

3. A hydrostatic assist drive as defined in claim 1, including an overrunning clutch driven by said motor.

4. A hydrostatic assist drive as defined in claim 1, wherein said plural-range axle drive includes a two-speed differential, a sliding dog clutch in said differential for selecting speed range, and a reciprocating piston actuator for controlling said sliding dog clutch.

5. A hydrostatic assist drive for a tractor-trailer which drives the wheels of the trailer to assist the main tractor drive, comprising: a hydraulic pump unit, a hydraulic motor unit, conduit means for conveying fluid from the pump to the motor, means for varying the displacement of one of said units, a plural-range axle drive driven by said motor unit, means for selecting the range of the axle drive, said pump having an input clutch adapted to be driven by the tractor prime mover, and means to engage the clutch to initiate the hydrostatic drive assist.

6. A hydrostatic assist drive for a tractor-trailer which drives the wheels of the trailer to assist the main tractor drive, comprising: a hydraulic pump unit, a hydraulic motor unit, conduit means for conveying fluid from the pump to the motor, means for varying the displacement of one of said units, a plural-range axle drive driven by said motor unit, and means for increasing the drive ratio of the hydrostatic drive during shifting of the axle drive.

7. A hydrostatic assist drive for a tractor-trailer which drives the wheels of the trailer to assist the main tractor drive, comprising: a hydraulic pump unit, a hydraulic motor unit, conduit means for conveying fluid from the pump to the motor, means for varying the displacement of one of said units, a plural-range axle drive driven by said motor unit, said displacement-varying means including means for varying the displacement of said pump, and valve means for reducing the displacement of the pump during axle shifting.

8. A hydrostatic assist drive as defined in claim 7, wherein said valve means serves to positively drive said pump toward zero displacement.

9. A drive for a tractor-trailer comprising; prime mover means for the tractor, tractor axle means driven by said prime mover, means for controlling the torque of said prime mover, a hydrostatic assist drive for the trailer, trailer axle means driven by said hydrostatic assist, said hydrostatic drive being driven by said prime mover, means for controlling the torque of said hydrostatic drive, said means for controlling the torque of the hydrostatic drive being responsive to said means for controlling the torque of said prime move, said means for controlling the torque of the prime mover including a fuel throttle, said means for controlling the torque of said hydrostatic transmission including a displacement control responsive to pressure in said conduit means, and means interconnecting said throttle and said displacement control.

10. A hydrostatic drive for a tractor-trailer which drives the wheels of the trailer as an assist function, comprising: a hydraulic pump unit, a hydraulic motor unit, conduit means interconnecting said pump and motor unit, means for varying the displacement of one of said units, a torque control for said displacement-varying means, throttle means for controlling the torque of the tractor, said torque control being responsive to said throttle means to select a pressure in said conduit means proportional to the position of said throttle means, said torque control being responsive to the pressure in said conduit means to maintain the torque of the hydrostatic drive at the desired level.

11. A hydrostatic drive as defined in claim 10, wherein said torque control includes a torque valve, said displacement-varying means including means for varying the displacement of the pump unit, a displacement control motor for said pump unit when pressurized increasing the displacement of said pump unit, means responsive to said throttle means for biasing said torque valve in a direction to port fluid to said pump unit control motor, and fluid-operable means responsive to pressure in said conduit means for biasing said torque valve in the opposite direction.

12. A hydrostatic assist drive for a tractor-trailer to drive the trailer as an assist to the tractive effort of the tractor wherein the tractor has a multiple-ratio main transmission, comprising: a hydraulic pump unit, a hydraulic motor unit, conduit means interconnecting the pump and motor units, means for varying the displacement of one of said pump or motor units to vary the tractive effort provided by the hydrostatic drive, control means for said displacement-varying means which normally tends to decrease the drive ratio in response to a decrease in tractive effort caused by tractor transmission shifting, and means for modifying the effect of said control means to maintain the tractive effort of the hydrostatic assist during shifting of the main tractor transmission.

13. A hydrostatic assist drive as defined in claim 12, wherein said displacement-varying means includes means for varying the displacement of said pump, said control means including means responsive to the pressure in said conduit means for reducing pump unit displacement in response to an increase in pressure in said conduit means above a selected value and for increasing the displacement of said pump unit in response to a decrease in pressure in said conduit means below said selected value.

14. A hydrostatic assist drive as defined in claim 13, wherein said means for modifying the effect of said control means includes a dashpot connected to said control means to retard movement thereof, and means for varying the effect of said dashpot.

15. A hydrostatic assist drive as defined in claim 12, including means for controlling the tractive effort of the tractor, said control means being responsive to said tractor tractive effort control means to increase the torque of said hydrostatic drive in response to an increase in torque of said tractor.

16. A hydrostatic assist drive for a tractor-trailer to drive the trailer as an assist to the tractive effort of the tractor wherein the tractor has a multiple-ratio main transmission, comprising: a hydraulic pump unit, a hydraulic motor unit, conduit means interconnecting the pump and motor units, means for varying the displacement of one of said pump or motor units to vary the tractive effort provided by the hydrostatic drive, control means for controlling the torque provided by the pump and motor units being responsive to said tractor control means so that the torque of the pump and motor units increases and decreases with the torque provided by the tractor, and means for retarding the effect of said pump and motor unit control means to reduce torque when the control means for the tractor calls for reduced tractor torque.

17. A hydrostatic drive for a tractor-trailer which drives the wheels of the trailer as an assist function, comprising: a hydraulic pump unit, a hydraulic motor unit, conduit means interconnecting said pump and motor unit, means for varying the displacement of one of said units, a torque control for said displacement-varying means, throttle means for controlling the torque of the tractor, said torque control being responsive to said throttle means to select a pressure in said conduit means proportional to the position of said throttle means, said torque control being responsive to the pressure in said conduit means to maintain the torque of the hydrostatic drive at the desired level, said torque control including a torque valve, said displacement-varying means including means for varying the displacement of the pump unit, a displacement control motor for said pump unit when pressurized increasing the displacement of said pump unit, means responsive to said throttle means for biasing said torque valve in a direction to port fluid to said pump unit control motor, fluid-operable means responsive to pressure in said conduit means for biasing said torque valve in the opposite direction, a pivotal control member responsive to the position of said throttle means, spring means biasing said torque valve in said first direction, piston means for positioning one end of said spring means, and fluid-controlled means responsive to said control member for positioning said piston means.

18. A hydrostatic drive as defined in claim 17, wherein said fluid-controlled means includes a rod slidable in said piston means and positioned by said control member, port means in said piston means, said rod controlling said port means to control the pressure acting on one side of said piston means.

Disclaimer 3,612,202.—*Harry C. Moon, Jr.*, Ogelsby, and *John W. Pinkerton*, La Salle, Ill. HYDROSTATIC WHEEL ASSIST. Patent dated Oct. 12, 1971. Disclaimer filed Dec. 13, 1973, by the assignee, *Sundstrand Corporation*.

Hereby enters this disclaimer to claims 1-5, inclusive, of said patent.

[*Official Gazette April 16, 1974.*]